United States Patent [19]

Saint

[11] 4,281,869
[45] Aug. 4, 1981

[54] AIR SPOILER

[76] Inventor: Joseph D. Saint, 4844 Fir St., San Diego, Calif. 92101

[21] Appl. No.: 108,462

[22] Filed: Dec. 31, 1979

[51] Int. Cl.³ .............................................. B60J 1/04
[52] U.S. Cl. .................................................... 296/1 S
[58] Field of Search ........................ 296/1 S; 105/2 R

[56] References Cited

U.S. PATENT DOCUMENTS

| 4,021,069 | 5/1977 | Hersh | 296/1 S |
| 4,056,279 | 11/1977 | Dorsch | 296/1 S |

FOREIGN PATENT DOCUMENTS 2619621  11/1977  Fed. Rep. of Germany ........... 296/1 S Primary Examiner—Robert R. Song
Attorney, Agent, or Firm—Hill, Van Santen, Steadman, Chiara & Simpson

[57] ABSTRACT

In combination for trailers and bob tail trucks, an air spoiler and an air foil mounted in assembly together. The air spoiler having a generally conical shape and being hollow at its annular open end. Means mounting structure is secured with the air spoiler adjacent to its annular open end for attaching the air spoiler to a truck trailer and the like. The generally conical shape includes a gently curving upper surface defined by an outer generally arcuately curved continuous lead edge and an under curved surface continuously joining the continuous curved lead edge with the open end of the air spoiler. The air foil has mounting means supporting it on the gently curving upper surface generally at its rear most upper end. The air foil has a generally arched shape which shape is arched in a direction away from the gently curving upper surface. A gap being located between the air foil and the upper surface and with the air foil being positioned for control of the air flow rearward of the combination along a top surface of a trailer body.

17 Claims, 7 Drawing Figures

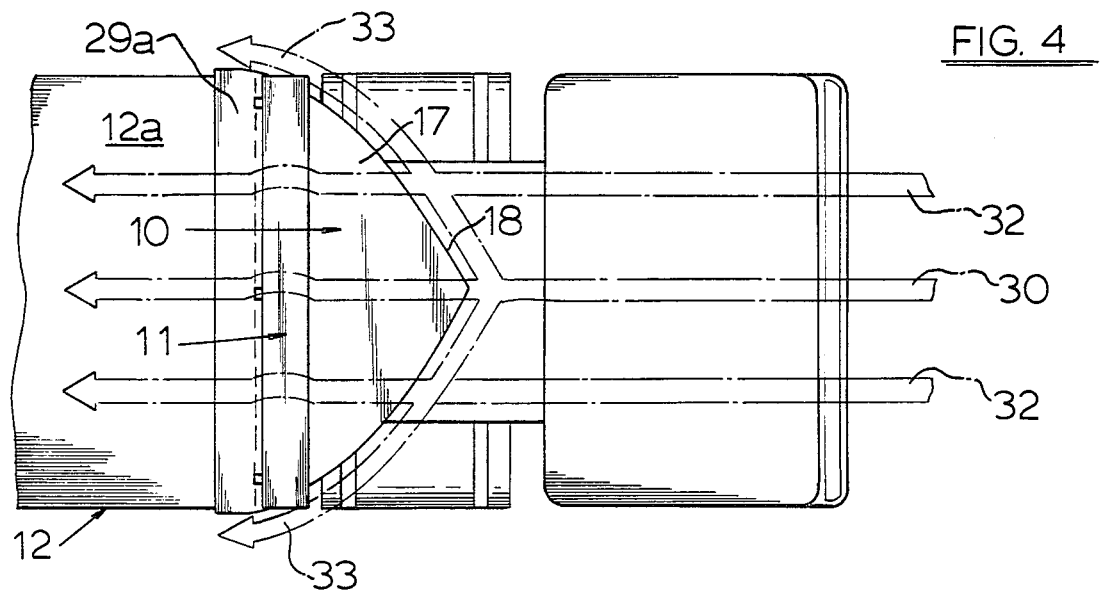
FIG. 4
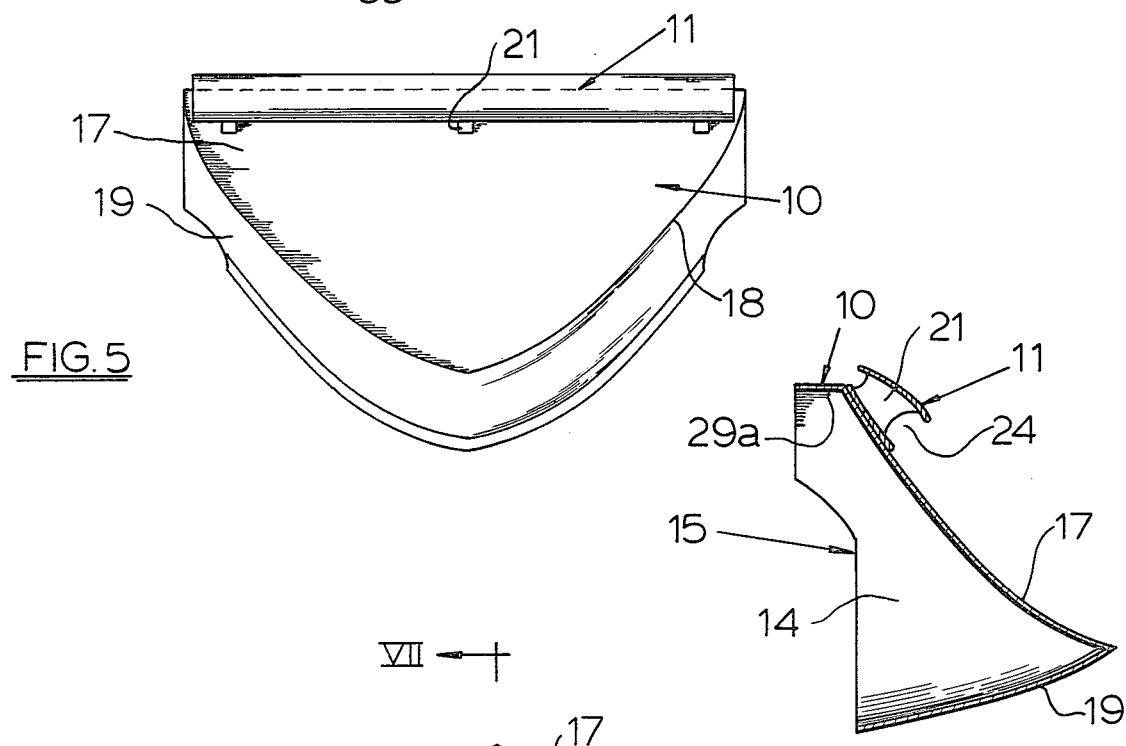
FIG. 5
FIG 7
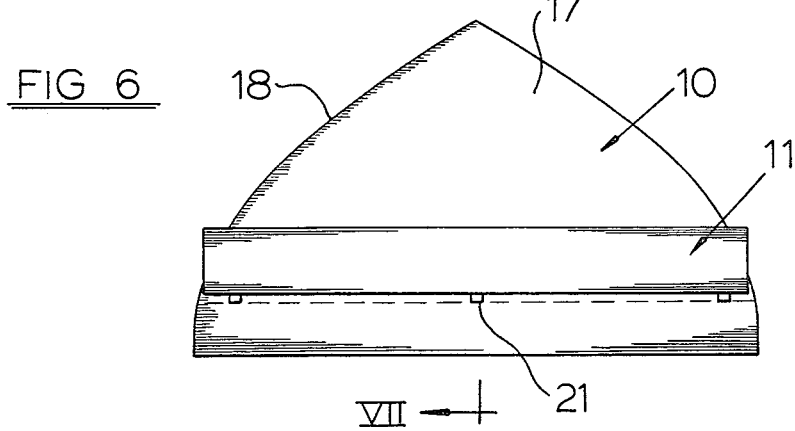
FIG 6

AIR SPOILER

FIELD OF THE INVENTION

This invention relates to an air spoiler and an air foil for truck trailers and bob tail trucks. More specifically the invention concerns a new and improved apparatus that breaks wind in direction around a truck trailer and the wind is directed closely to the trailer to virtually eliminate vacuum and to thereby minimize drag on the trailer with the result that better gas mileage can be achieved in the road travel of the truck trailer and also driving times can be reduced from point A to point B.

BACKGROUND OF THE INVENTION

Various types of air spoilers are already known in the art and in this connection attention is directed to typical patents such as German Pat. No. 109,199 issued Mar. 26, 1928, U.S. Pat. No. 3,415,566 and U.S. Pat. No. 3,866,967. Also other types of air shields have been mounted on top of the truck cab and also on the front face of the trailer body. Wind shields have been of varying types such as the one shown in U.S. Pat. No. 3,866,967.

SUMMARY OF THE INVENTION

The present invention is particularly concerned with a new and improved air spoiler and air foil combination which is adapted to regulate air flow rearwardly of the trailer body and up over the trailer body because of the unique construction and shape of the air spoiler and also because of the advantageous positioning of the air foil with respect to the air spoiler and the truck body.

It is further believed that the air spoiler per se is of a new and improved unique construction and constitutes a separate and distinct invention in addition to the combination described in the preceeding sentence. It will be perceived however that the most advantageous result can be achieved where the air spoiler and the air foil are used in combination together on the truck body.

According to important features of this invention there is provided a combination for trailers and bob tail trucks which comprises an air spoiler and an foil mounted in assembly together. The air spoiler has a generally conical shape and is hollow at it annular open end. Means or attachment stucture is provided for securing the air spoiler adjacent to its open end for attaching the air spoiler to the truck trailer and/or the like. The generally conical shape includes a gently curving upper surface that is defined by an outer generally arcuately curved continuous lead edge and an undercurved surface continuously joining the continuous lead edge with the open end of the air spoiler. The air foil has mounting means or spaced legs supporting it on the gently curving upper surface generally at its rearmost upper end. The air foil itself has a generally arched shape which shape is arched in a direction away from the gently curving upper surface. A gap is positioned between the air foil and the upper surface and the air foil is positioned for control of the air flow rearward of the combination along a top surface of a trailer body.

Other features of this invention relate to the unique construction of the air spoiler which lends itself to manufacture from a fiberglass material and which has a hollow construction to reduce the weight thereof.

Still other features of this invention concern the formation of a fiberglass air spoiler which air spoiler has an essentially flat rear face for abutment against a flat forward face of a trailer body and attachment means are provided for securing the same in assembly together.

Other objects and features of this invention will become apparent in view of the following detailed description of the accompanying drawings.

BRIEF DESCRIPTION OF THE DRAWINGS

An exemplary embodiment is described below with reference to the accompanying drawing wherein:

FIG. 4 is an enlarged fragmentary top plan view of the semi truck trailer and cab shown in FIG. 3 and with the arrows again showing the air flow as the truck is driven in a forward direction;

FIG. 5 is a front view of the combination air spoiler and air foil as is shown in the other figure;

FIG. 6 is a top plan view of the combination air spoiler and air foil; and

FIG. 7 is a vertical section taken on the lines VII-—VII looking in the direction indicated by the arrows as seen in FIG. 6.

DESCRIPTION OF AN EXEMPLARY EMBODIMENT

Figure 1:
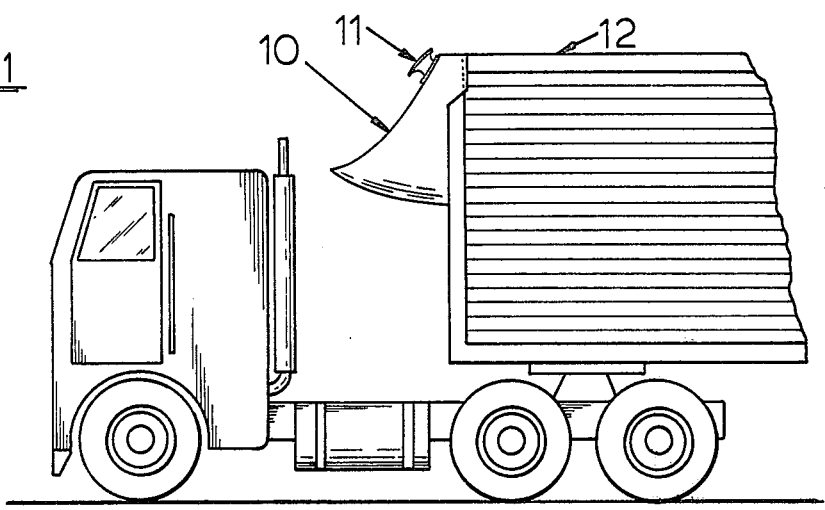
FIG. 1 is a fragmentary side view of a semi truck trailer with my improved air spoiler and air foil combination mounted thereon.

The reference numeral 10 indicates an air spoiler and the reference numeral 11 indicates an air foil and this combination of elements 10 and 11 as well as the air spoiler 10 per se embody important features of my invention. It will be noted that the air spoiler 10 and the air foil 11 are mounted in assembly together on a trailer truck body or trailer 12. This combination of components can also be used on so-called bob tail trucks and other vehicles of the class where it is desirous of minimizing air resistance during road travel.

The air spoiler has a generally conical shape 13 and is hollow 14 at its annular open end 15. Attachment structure 16 is provided for securing the air spoiler 10 adjacent its open end 15 to a truck trailer body 12 and the like. This air spoiler 10 is of a generally conical shape 13 and importantly includes a gently curving upper surface 17 that is defined at its perimeter by an outer generally arcuately curved continuous lead edge 18 and an under curved surface 19 which is continuously joined with the continuous curved lead-edge 18 and with the open end 15 of the air spoiler. The air spoiler 13 is illustrated on the drawings as a scale drawing particularly with regard to surfaces 17 and 19 and lead edge 18 and the same is true relative to the air foil 11 and its relationship to the spoiler 10 and the top of the truck body. The air foil 11 has a mounting structure 21 illustrated in the form of spaced legs for supporting it on the gently curving upper surface 17 generally at an upper most end 22 of the surface 17. The mounting structure 21 is suitably fastened to the surface 17 by suitable fasteners such as nuts and bolts. The air foil 11 is of a generally arched shape 23 which shape is arched in a direction away from the gently curving upper surface 19. A gap 24 is located between the air foil 11 and the upper surface 19 and the air foil 11 is so positioned for control of the air flow rearwardly of the combination along a top surface 25 of a trailer body 12.

Figure 2:
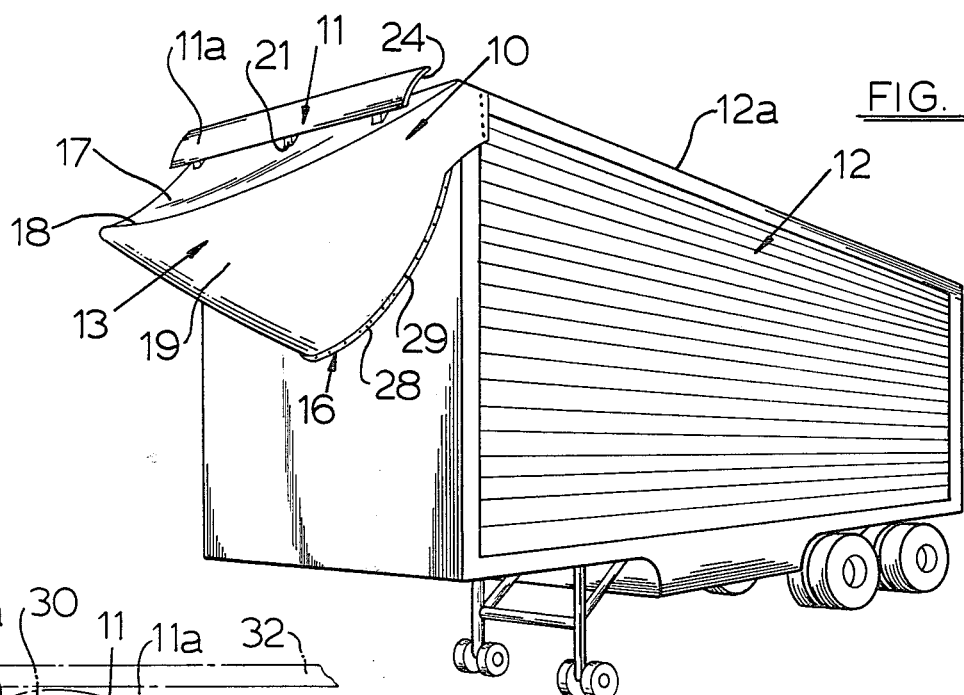
FIG. 2 is a perspective view of a semi trailer with the air spoiler and air foil combination illustrated thereon.
Figure 3:
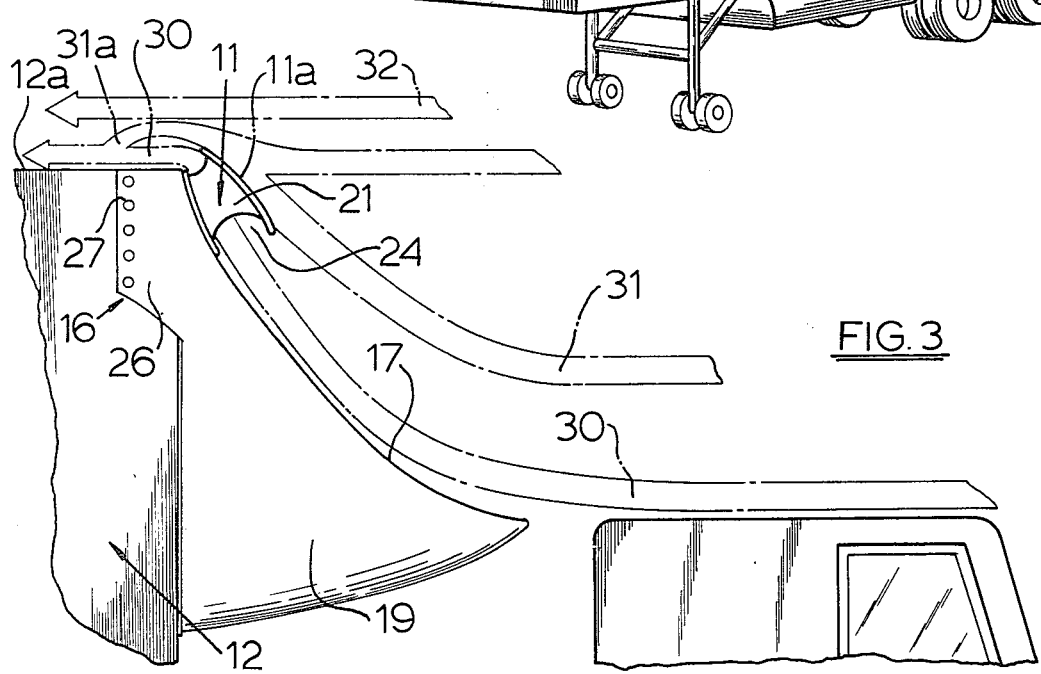
FIG. 3 is an enlarged fragmentary side view of a semi truck trailer with the air spoiler and air foil mounted thereon and with directional arrows depicting the manner in which air flow can be controlled as the truck trailer is driven in a forward direction to minimize drag.

The air spoiler 10 is illustrated as being secured on the truck body 12 and in this respect it will be noted that the undercurved surface terminates at upper ends in attachment flanges 26, 26 which are positioned for face to face engagement with longitudinal side walls of the truck body 12 and are adapted to be secured thereto by fasteners 27 as seen in FIG. 3. In addition, the undercurved surface 19 terminates in an essentially flat curving flange 28 which follows the contour of the surface 19 which flat flange surface 28 is attached to a forward face of the truck body by suitable fasteners 29 as indicated in FIG. 2. Still further, the spoiler 10 has a top flat flange 29a (FIG. 7) which is adapted to engage upon a top surface of the trailer body which top surfaces indicate generally at 12a in FIG. 3. The top surface at 29a can be suitably secured to the top surface of the trailer body 12a by fasteners of the same type as previously described. It will thus be seen from a consideration of FIG. 2 that the gently curving upper surface 17 terminates and is then merged into the flat surface 29a and that this flat surface 29a extends substantially the full width of the truck body 12.

Where the spoiler 10 and the foil are mounted on the truck body 12 and when the trailer 12 is moving forwardly certain advantageous air flow characteristics are developed which embody important features of this invention. In this respect, because of the scoop shaped conformation of the air spoiler at 10 and because of the shapes and the gently curving upper surface 17 and the undercurved surface 19, the airflow can be controlled particularly where the air foil is positioned as illustrated in the drawings so that air flow can move along the curve 17 as indicated at 30 and flow beneath the air foil 11 and then along the top surface 12a of the truck body 12. The reference numerals 30, 31 and 32 have been provided for showing the various air flow characteristics. The arrows 31 show how the air can flow over the top of the air foil and then can flow in such a way that its air stream will merge with the air stream flowing beneath the foil 11 as indicated generally at 30 and with the point of merger indicated at 31a in FIG. 3. The air flow arrow 32 shows how a slip stream can pass over the air spoiler 10 and the point where the air foil is attached thereto.

The industrial model air spoiler 10 is designed with a geometric body, having three surfaces, two of which are curved and identified at 17 and 19 respectively and one flat surface that takes the place of the base. The lower curved surface 19 is approximately conical. The upper surface 17 is formed in a cylindrical section allowing space between the surfaces of an angle that, seen from the front, forms a parabola. The base in conjunction also resembles on its contour a parabola with the outer part approximately parallel. The entire air spoiler 10 is made of an approximately 3/16" fiberglass which can be formed by use of a chopper gun as is known in the art.

The industrial model air foil is designed with a geometric body, made in a shape of a wing-type air foil. The top section has a curved shape to catch wind from the spoiler and operates to direct the wind to proceed within inches of the top of the trailer for less wind resistance, and to direct the wind across the top of the trailer. The top wing or arched surface 11a is made of ⅛" rolled aluminum material. This air foil has three legs 21 all comprised of ¼" aluminum which attach on the top of the curved surface 17 of the spoiler as previously described. The base of the legs 21 are curved to fit the contour of the top plan 17 of the spoiler. The base of the legs 21 are adjustable forward and aft to change the angle of wind and maximum trailer height, and maximum efficiency of the air spoiler to achieve maximum wind control, stability and to improve useage of fuel and reduce mechanical wear.

As previously described, the air spoiler 10 and the air foil 11 operate to break wind in a direction around the trailer as indicated by the arrows. The wind is directed closely to the trailer to virtually eliminate vacuum. By eliminating a vacuum a substantial amount of drag can be reduced on the trailer. With the wind being controlled and caused to flow next to the trailer when passing thereover there is then less wind vibration and the vehicle can be better controlled. Also by eliminating vacuum between the trailer and the cab, the air can flow in a continuous even motion to achieve a greater trailer stability.

Certain tests have been run for the purpose of evaluating the effectiveness of the air spoiler 10 and the air foil 11, as reported hereafter.

San Diego State University, on WIND TUNNEL TEST, April 21, 1977. Nose cone or spoiler 10 and Air Foil test for trucks. Fifty mph. to one hundred and twenty mph. Model 1/25 scale scale.CODE One - Nose and Air Foil
Two - Nose Cone
Three - Truck only
V - Velocity
% - Percentage
D - Drag
mph. - Miles per hour (1 lbs.) - mph.-1.376 klm (lbs.)

V-50 mph.

(1) % drag decrease between 3 & 2 $\frac{587 - 459}{587}$ (100) — 18

(2) % drag decrease between 2 & 1 $\frac{459 - 436}{459}$ (100) — 5

(3) % drag decrease between 3 & 1 $\frac{587 - 436}{587}$ (100) — 25.7

V-60 mph.

(1) % drag decrease between 3 & 2 $\frac{844 - 729}{844}$ (100) — 13.62

(2) % drag decrease between 2 & 1 $\frac{729 - 705}{729}$ (100) — 3.29

(3) % drag decrease between 3 − 1 $\frac{844 - 705}{844}$ (100) — 16.47

V-70 mph.

(1) % drag decrease between 3 & 2 $\frac{1101 - 999}{1101}$ (100) — 9.23

(2) % drag decrease between 2 & 1 $\frac{999 - 974}{999}$ (100) — 2.50

(3) % drag decrease between 3 & 1 $\frac{1101 - 974}{1101}$ (100) — 8.45

V-80 mph.

(1) % drag decrease between 3 & 2 $\frac{1415 - 1312}{1415}$ (100) — 7.25

(2) % drag decrease between 2 & 1 $\frac{1312 - 1297}{1312}$ (100) — 1.14

(3) % drag decrease between 3 & 1 $\frac{1415 - 1312}{1415}$ (100) — 7.26

V-90 mph.

(1) % drag decrease between 3 & 2 $\frac{1730 - 1632}{1730}$ (100) — 5.66

(2) % drag decrease between 2 & 1 $\frac{1632 - 1546}{1632}$ (100) — 5.66

(3) % drag decrease between 3 & 1 $\frac{1730 - 1546}{1730}$ (100) — 10.63

V-100 mph.

(1) % drag decrease between 3 & 2 $\frac{2154 - 2078}{2154}$ (100) — 3.52

San Diego State University, on WIND TUNNEL TEST, April 21, 1977. Nose cone or spoiler 10 and Air Foil test for trucks. Fifty mph. to one hundred and twenty mph. Model 1/25 scale (2) % drag decrease between 2 & 1 $\frac{2078 - 1893}{2078}$ (100) — 8.90

(3) % drag decrease between 3 & 1 $\frac{2154 - 2078}{2154}$ (100) — 3.52

V-110 mph.

(1) % drag decrease between 3 & 2 $\frac{2648 - 2413}{2648}$ (100) — 8.87

(2) % drag decrease between 2 & 1 $\frac{2413 - 2374}{2413}$ (100) — 1.62

(3) % drag decrease between 3 & 1 $\frac{2648 - 2374}{2648}$ (100) — 10.35

V-120 mph.

(1) % drag decrease between 3 & 2 $\frac{2959 - 2796}{2959}$ (100) — 5.50

(2) % drag decrease between 2 & 1 $\frac{2796 - 2754}{2796}$ (100) — 1.50

(3) % drag decrease between 3 & 1 $\frac{2459 - 2754}{2459}$ (100) — 6.29

Additional tests run under my supervision revealed the following results
March 21, 1979 thru March 27, 1979
Fuel Economy Test Run and Time Run
Weight net 30220 load 23840 gross 54060

(1) Dry Run - 285 mi.-5.5 hrs.-59.6 gal.-4.78 mi. per gal.
(2) Spoiler - 285 mi.-5.0 hrs.-48.0 gal.-5.93 mi. per gal.
FUEL SAVED WITH SPOILER 19.39%
(3) Airfoil - 285 mi.-5.0 hrs.-46.0 gal.-6.19 mi. per gal.
FUEL SAVED WITH AIRFOIL 22.77%
(4) Dry Run - 285 mi.-5.0 hrs.-86.6 gal.-3.20 mi. per gal.
(5) Spoiler - 285 mi.-4.1 hrs.-91.3 gal.-3.10 mi. per gal.
Time Saved 18% - Fuel Loss 3.12%

TIME TEST (1) Dry Run - 285 mi.-5.5 hrs.

Time Saved 9.09%

Spoiler - 285 mi.-5.0 hrs.
(3) Airfoil - 285 mi.-5.0 hrs.

Time Saved 9.09%

(4) Dry Run - 285 mi.-4.1 hrs.

Time Saved 10.0%

(5) Spoiler - 285 mi.-4.1 hrs.
MILES PER HOURS
(1) Dry Run - 285 mi.-5.5 hrs.-51.81 mi. per hrs.
(2) Spoiler - 285 mi.-5.0 hrs.-57.00 mi. per hrs.
MILES PER HOUR INCREASE 9.10%
(3) Airfoil - 285 mi.-5.0 hrs.-57.00 mi. per hrs.
MILE PER HOUR INCREASE 9.10%
(4) Dry Run - 285 mi.-5.0 hrs.-57.00 mi. per hrs.
(5) Spoiler - 285 mi.-4.1 hrs.-69.51 mi. per hrs.
PER HOUR INCREASE 17.99%
FUEL ECONOMY TEST RUN and TIME RUN
AVERAGE ON FUEL AND TIME (1) Dry Run - 570 mi.-9.10 hrs.-62.63 mi. per hrs.
139.30 gal.-4.09 mi. per gal.

Fuel Saved 31.02%

(2) Airfoil - 570 mi.10.30 hrs.-54.28 mi. per hrs.
96.0 gal.-5.93 mi. per gal.
(3) Dry Run - 570 mi.-9.10 hrs.-62.63 mi. per hrs.

Time Lost 11.65%

(4) Airfoil - 570 mi.-10.30 hrs.-54.28 mi. per hrs.
Test run San Diego, California - Gila Bend, Arizona
Performance of truck on hills (without air spoiler)

| Landmark | Speed | Gear | Elevation |
|---|---|---|---|
| El Cajon | 50 | 11 | 1,000 |
| Alpine | 34 | 8 | 2,000 |
| E. Willow Road | 45 | 10 | |
| Viewpoint | 39 | 9 | |
| Japetul Rd. | 34 | 8 | |
| Sunrise Highway | 34 | 8 | 4,000 |
| Crestwood Highway | 34 | 8 | 4,000 |
| Tocate Summit | 26 | 6 | 4,192 |
| (With air spoiler) | | | |
| El Cajon | 50 | 11 | 1,000 |
| Alpine | 43 | 10 | 2,000 |
| E. Willow Rd. | 50 | 11 | |
| Viewpoint | 44 | 10 | |
| Japetul Rd. | 39 | 9 | |
| Sunrise Highway | 56 | 10 | 4,000 |
| Crestwood Highway | 40 | 9 | 4,000 |
| Tocate Summit | 55 | 11 | 4,192 |

Baja California Mexico
time run and stability test
April
1978. Truck and trailer
transporting liquid cargo
29 tons,
using air spoiler only.

Without spoiler
Miles          539.375          Fuel 162.15 gal.
Time           13 hrs. 25 min.
Cargo Tons     29
With Spoiler
Miles          539.375          Fuel 139.98 gal.
Time           11 hrs. 10 min.
Cargo Tons     29

The Truck Driver Stated:
1. Truck and trailer handled much easier with the air spoiler.
2. Truck had more horse-power for climbing hills, using less gears with the air spoiler.
3. Truck and trailer had more stability under different wind conditions, such as wind created by passing trucks and fixed objects along the roadway, and wind created by nature with use of the air spoiler on the truck.

Note: We were not trying to conserve on fuel.

I claim:

1. In combination for trailers and bob tail trucks, an air spoiler and an air foil mounted in assembly together, the air spoiler having a generally conical shape and being hollow at its annular open end, means secured with the air spoiler adjacent to its annular open end for attaching the air spoiler to a truck trailer and the like, the generally conical shape including a gently curving upper surface defined by an outer generally arcuately curved continuous lead edge and an under curved surface continuously joining the continuous curved lead edge with the open end of the air spoiler, the air foil having mounting means supporting it on said gently curving upper surface generally at its rear most upper end, the air foil having a generally arched shape which shape is arched in a direction away from said gently curving upper surface, and a gap being located between the air foil and said upper surface and with said air foil positioned for control of the air flow rearward of the combination along a top surface of a trailer body.

2. The combination of claim 1 further characterized by said air spoiler being of a scoop-shaped configuration as viewed from its underside when unattached to a trailer body.

3. The combination of claim 2 further characterized by the air spoiler being of a fiberglass composition and comprising a one piece construction.

4. The combination of claim 1 further characterized by the undercurved surface having a continuous flange at its rearward most edge and with said means being adapted to secure said flange to a trailer body.

5. The combination of claim 1 further characterized by said undercurved surface having a pair of attachment flanges at its upper rearward most areas and with said means being adapted to secure said flanges to opposed sides of a trailer body.

6. The combination of claim 1 further characterized by said generally arcuately curved continuous lead edge and said undercurved surface merging at a common conical apex and cooperable with said gently curving upper surface providing the generally conical shape on said air spoiler.

7. The combination of claim 1 further characterized by the arched shape air foil having an uppermost edge spaced vertically above a vertically top edge of the air spoiler to facilitate air flow through said gap along a top surface of a trailer body.

8. An air spoiler for trailers and bob tail trucks comprising a generally conical shape and being hollow at its annular open end, means for attachment with the air spoiler adjacent its annular open end for attaching the air spoiler to a truck trailer and the like, the generally conical shape including a gently curving upper surface defined by an outer generally arcuately curved continuous lead edge and an undercurved surface continuously joining the continuous curved lead edge with the open end of the air spoiler, an air foil, and mounting means connecting the air foil in assembly with the air spoiler, the air foil being positioned in adjacency to a rear most upper end of said gently curving upper surface and in spaced relation thereto to allow air flow between said surface and the air foil rearwardly over said rearmost upper end for flow along a top surface of a trailer body.

9. The air spoiler of claim 8 further characterized by said air spoiler being a scoop-shaped configuration as viewed from its open end when unattached to a trailer body.

10. The air spoiler of claim 8 further characterized by the air spoiler being of a fiberglass composition and comprising a one piece construction.

11. The air spoiler of claim 8 further characterized by the undercurved surface having a continuous flange at its rearward most edge and with said means being adapted to secure said flange to a trailer body.

12. The air spoiler of claim 8 further characterized by said undercurved surface having a pair of attachment flanges at its upper rearward most areas and with said means being adapted to secure said flanges to opposed sides of a trailer body.

13. The air spoiler of claim 8 further characterized by said generally arcuately curved continuous lead edge and said under curved surface merging at a common conical apex and cooperable with said gently curving upper surface providing the generally conical shape on said air spoiler.

14. The air spoiler of claim 8 further characterized by the curved continuous lead edge and the undercurved surface being formed in the shape of a parabola.

15. The combination of claim 1 further characterized by the curved continuous lead edge and the undercurved surface being formed in the shape of a parabola.

16. The combination of claim 1 further characterized by the air spoiler having a relatively flat rear face adjacent its annular open end for face to face engagement with a flat surface on a forward end of a truck trailer.

17. The air spoiler of claim 1 further characterized by the air spoiler having a relatively flat rear face adjacent its annular open end for face to face engagement with a flat surface on a forward end of a truck trailer.

* * * * *